Patented Feb. 26, 1929.

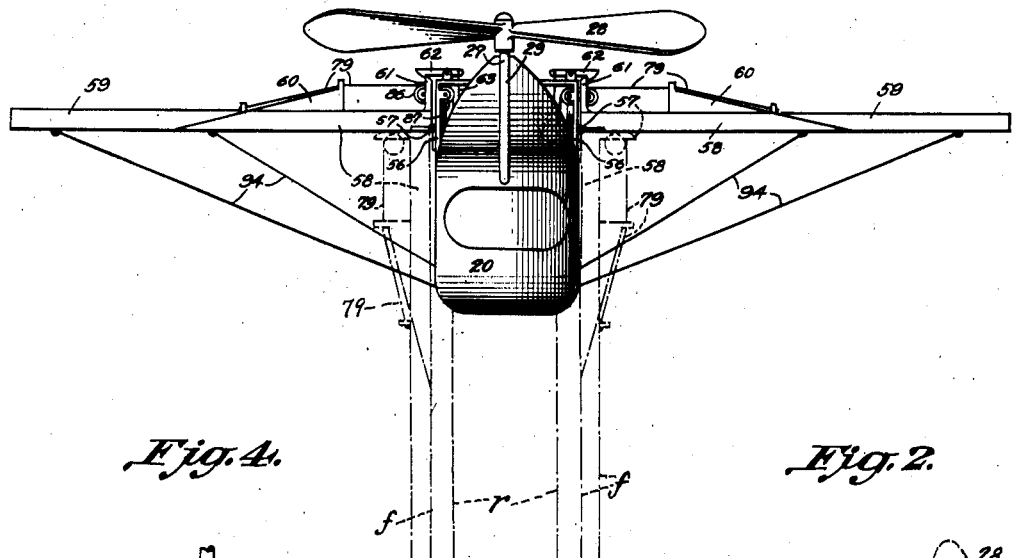
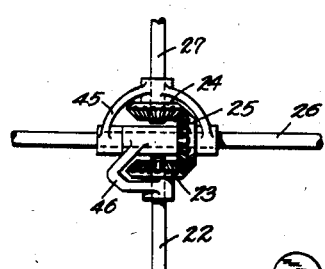
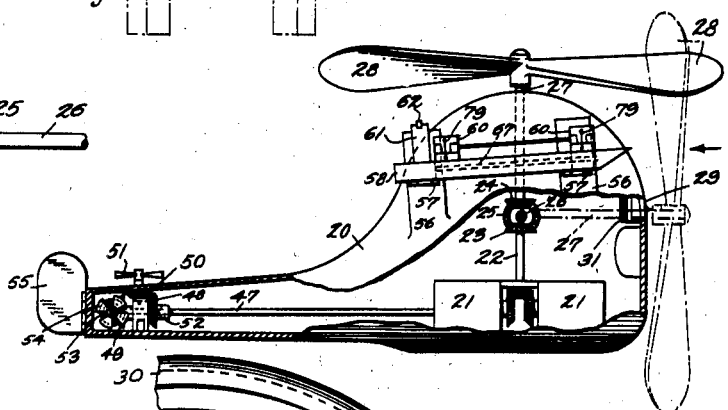
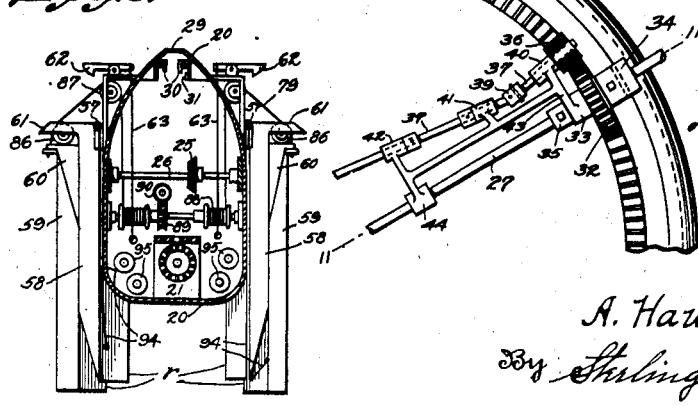

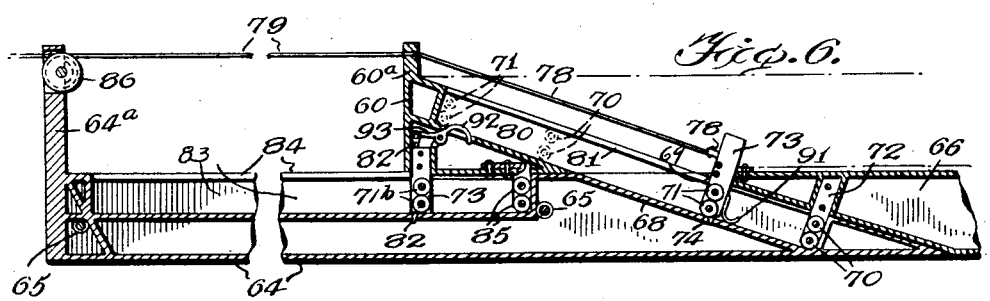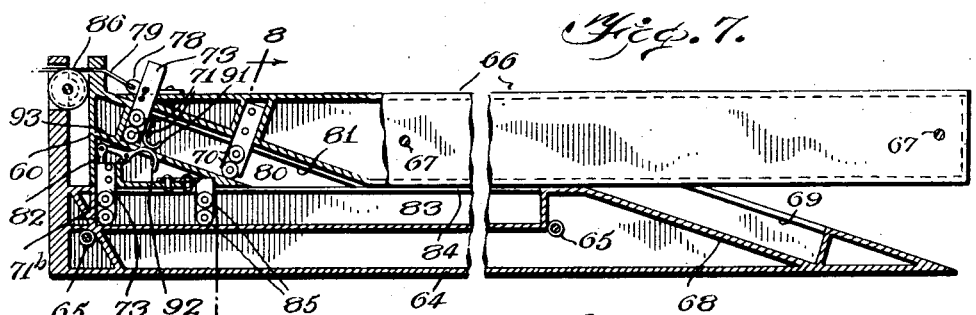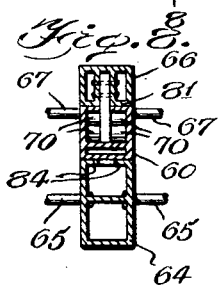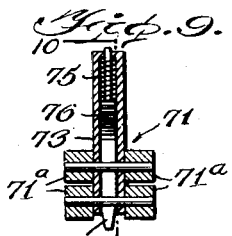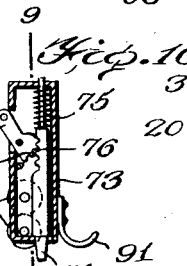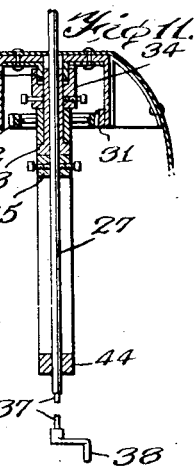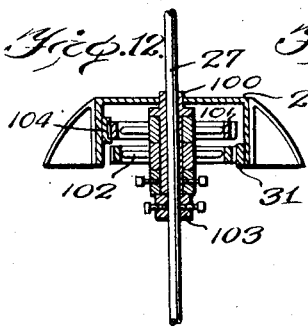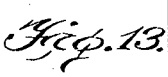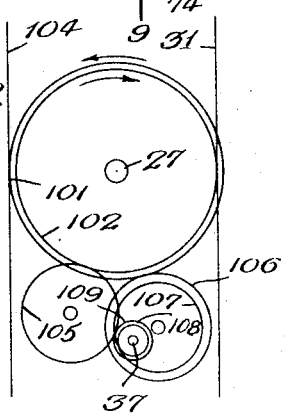

1,703,621

UNITED STATES PATENT OFFICE.

ALVAH HAWORTH, OF LONG BEACH, CALIFORNIA, BY DECREE OF DISTRIBUTION TO LUELLA HAWORTH.

FLYING MACHINE.

Application filed October 1, 1924. Serial No. 740,938.

This invention relates to flying machines, and especially to an improved form of helicopter flying machines.

One object of this invention is to provide a combined horizontally and vertically propelled flying machine with an improved gearing for shifting the propeller from the horizontal to the vertical position, that is, from the position in which its axis is horizontal to the position in which its axis is vertical.

Another object is to provide a machine of this character (having a rudder) with auxiliary propellers which serve as steering means when the machine is flying at low speed.

Another object is to provide a machine of this character with wings or planes which can be folded and collapsed and thus enable the machine to alight on the deck of a vessel or on any other comparatively small surface without danger of breaking the wings or planes.

Another object is to provide a machine of this character of which the planes are forwardly diverging when they are folded downward, to effect the automatic spreading and raising of the planes when the machine has risen and begun to move forward.

Another object is to provide simple and effective means for holding the wings or planes in the extended position, and also to provide means to automatically unlock such holding means by the operation of collapsing the planes.

Other objects and important features will be pointed out or implied in the following details of description, in connection with the accompanying drawings in which:

Figure 1 is a front view of the machine having its wings or planes extended, and having its propeller in the vertical position, this being the relation of parts in preparation for alighting, or just previous to permitting the wings or planes to be lowered into the broken line position.

Fig. 2 is a right side view of the machine, a part of the casing being broken away and showing the operating and controlling devices therein, the propeller being shown in full lines in its vertical position, and in broken lines in its horizontal position.

Fig. 3 is a vertical sectional view, the section being taken through the casing, substantially in the plane immediately forward of the propeller-shaft-connection, that is, the horizontal shaft and gear which connects the upper and lower sections of the propeller-shaft. In this view the planes are folded and collapsed, and their lower ends rest upon the ground or other surface represented by the lowermost horizontal line.

Figure 4 is an enlarged detail view of the propeller-shaft-connection.

Fig. 5 is an enlarged detail view of the upper section of the propeller shaft, and the gearing whereby it is shifted from the vertical to the horizontal position and vice versa.

Fig. 6 is an enlarged longitudinal sectional view of one of the collapsible units of the planes, parts being broken away, and the outer section of this unit being shown in full lines and in broken lines.

Fig. 7 is a view of the same parts that are shown in Fig. 6, except being broken out at a different part, but showing the three collapsible sections in the collapsed position.

Fig. 8 is a sectional view in the line 8—8 of Fig. 7.

Fig. 9 is an enlarged sectional detail view in the line 9—9 of Fig. 10.

Fig. 10 is a sectional detail view in the line 10—10 of Fig. 9.

Fig. 11 is a sectional view along the line 11—11 of Fig. 5.

Fig. 12 is a view illustrating a modified form of the propeller-shifting gearing.

Fig. 13 is a diagrammatic view of the modified form of Fig. 12, including the actuating and intermediate gearings which are eliminated from Fig. 12.

Referring to these drawings in detail, in which similar reference characters correspond to similar parts throughout the several views; the main body or casing 20 is equipped with one or two engines or motors 21, so that one of them may continue to operate if the other one becomes inactive, and both of these prime movers are geared to the lower section 22 of the propeller shaft and provided with a bevel gear 23 which connects with a similar bevel gear 24 through the medium of a third bevel gear 25 which is mounted on a shaft 26 having its ends journaled in suitable bearings on opposite walls of the casing 20. The gear wheel 24 is mounted on the upper section 27 of the propeller-shaft which carries the propeller 28.

A forwardly and rearwardly extending slot 29 is provided in the casing 20, and the propeller-shaft swings upward and downward or forward and rearward in this slot. Arcuate guiding flanges 30 are provided adjacent the slot 29, and a rack 31, or gear-segment, is also mounted below and adjacent to the slot 29. A gear wheel 32 is journaled on a sleeve 33 through which the shaft 27 extends, and in which it rotates, this sleeve 33 being united with a guiding element 34 which provides slots into which the guiding flanges 30 extend. These slots of the part 34 accurately guide the shaft 27, and at the same time prevent rotation of the sleeve 33. A collar 35 (on the shaft 27) holds the member 34 in engagement with the flanges 30, and also holds the gear-wheel 32 in mesh with the arcuate rack 31.

According to one form of the invention, (as shown in Figures 5 and 11), an actuating mechanism for the gear 32 includes a gear-pinion 36, a shaft 37 and an actuating handle 38. Because of the bevel of the wheel 32, and the resultant necessary bevel of the wheel 26, it may be preferable to provide the shaft 37 with a universal joint 39. The shaft 37 is mounted in bearings 40, 41 and 42 of a frame which includes an arm 43 extending from the sleeve 33, and also including a bearing 44 in which the shaft 27 rotates. The operation of the propeller-shifting gearing is as follows:

To move the propeller from the full line to the broken line position of Fig. 2, or vice versa, the handle 38 is rotated, thereby rotating the shaft 37 and pinion 36. This rotates the shaft 32, and causes it to travel along the segmental rack 31, according to the direction in which the handle 38 is being rotated. Any other appropriate form of handle may be employed, and any appropriate means (not shown) may be employed for securing the handle or the shaft 37 in any desired position, for holding the propeller in the vertical position, the horizontal position or an intermediate position. To anyone familiar with the construction and operation of gearings, it is apparently unnecessary to explain how the lower section of the propeller shaft is always operatively connected with the upper section thereof through the medium of the connecting gear 25, these gears 23, 24 and 25 being always held in mesh by means of the bearing elements 45 and 46, but it is here explained that the gear-wheel 25 rotates between the right-hand bearing and the central bearing in Figure 4, and that the bearing elements 45 and 46 have relative movement about the axis of the shaft 26.

One of the engines 21 is provided with a shaft 47 which carries a gear 48 and a second gear 49. The gear 48 meshes with the gear 50 on the same shaft with a vertical propeller 51 which is operable to deflect the tail of the machine up and down, according to the direction of rotation of the shaft 47. A clutch 52 may be operated by any appropriate means (not shown), and I may also employ any appropriate reversing means for the shaft 47.

The gear wheel 49 meshes with a gear wheel 53 on a shaft which carries a horizontal propeller 54, the same being operable to deflect the tail of the machine rightward and leftward when the machine is moving too slowly to be guided by the rudder 55. Any appropriate means (not shown) may be employed for operating the rudder.

Uprights 56 are provided on each side of the casing 20, and these are provided with hinges 57 on which the inner sections 58 of the planes are secured. Each plane also includes an outer section 59 and an intermediate section or carriage 60. The inner sections are provided with uprights 61 which are engaged by latches 62 which are hinged on the uprights 56. Cables 63 are connected to the latches 62 and provided with handles by which they may be pulled for releasing the latches 62 from the uprights 61. Of course, these cables may, if desired, be connected to any appropriate means for actuating them simultaneously.

The outer and inner section of each plane preferably includes two or more of the units shown in Figures 6, 7 and 8, these units being preferably hollow, for the sake of lightness and rigidity. The inner sections 64 of the units of each plane may be connected by brace rods 65, and the outer sections 66 being connected by brace rods 67. Any desired number of such brace rods may be used in any appropriate way for holding the pairs or sets of inner sections and the pairs or sets of outer sections in rigid relation with one another; and the covering of cloth or other appropriate material (not shown per se) may be applied to these sections in any appropriate way and secured by any appropriate means. In this connection, it should be understod that these drawings are diagrammatic to a considerable extent, and illustrate the principles without any attempt at perfect accuracy of design.

Each inner section 64 has its outer end beveled or outwardly and downwardly inclined, and each outer section 66 has its inner end correspondingly beveled, that is, having its lower surface outwardly and downwardly inclined and seated on the beveled upper surface of the inner section. However, it is thus seated (as shown in full lines in Fig. 6,) only when the planes are extended; for when the planes are collapsed, the sections 66 of each plane overlie the sections 64 of each plane, as shown in Figs. 7 and 3. For the purpose of thus extending and collapsing the planes, each inner section 64 is provided with a channel 68 having inwardly extending flanges 69; and each outer section 66 is provided with quadruple casters 70 and 71, the construction of which will be better understood by reference to Figs. 9 and 10. Each set of quadruple casters includes an upper pair and a lower pair of rollers 71$^a$ having their axles supported in a hollow casing 72 or 73, one each of these casings being secured to one of the sections 66, and their lower rollers roll on the lower surface of the channel 68 while their upper rollers roll on the under sides of the flanges 69. Each casing 73 contains a bolt or latch 74 whose lower end extends through a hole in the bottom of the channel 68 for securing the inner and outer sections in their extended position. The bolt 74 is preferably pressed downward by means of a spring 75, and may be raised by any appropriate means. For this purpose I may provide the bolts 74 with racks 76, and may provide a segment 77 for each rack 76. An arm 78 may extend upward and outward through an opening in each casing 73, and such arm may be apertured for engagement with a cable 79 which may be pulled by any appropriate means for disengaging the bolt 74 from its seat and then pulling the member 66 upward and inward to the position shown in broken lines of Fig. 6 where it engages with the carriage 60 in the manner which will now be described as follows:

The carriage 60 has its upper side outwardly and downwardly inclined and is provided with a channel 80 having inwardly extending flanges 81 which are alined with the flanges 69 of the inner section. In fact, the channel 80 is alined with the channel 68 when the plane is extended, so that the quadruple casters roll from the channel 68 into the channel 80 when the section 66 is moved into the broken line position of Fig. 6. For the purpose of securing the carriage 60 in the position to receive the casters from the channel 68, a latch or plunger 82 is provided in a casing 73 similar to that shown in Figure 9 which also carries upper and lower pairs of casters indicated at $71^b$. This casing 73 is secured to the carriage 60, and its lower casters roll on the bottom of the channel 83 provided with inwardly extending flanges 84 against which the upper rollers rest and roll. The carriage 60 is also provided with a quadruple caster 85 which differs from the quadruple caster 70 only in the means of securing it to the carriage 60.

The carriage 60 is provided with an upward extension $60^a$ having an opening therethrough. The inner section 64 also has an upward extension, indicated at $64^a$, and this upright is preferably provided with a grooved wheel 86 over which the cable 79 passes from the arm 78 and through the upright $60^a$. It should be understood that all parts shown in Figures 6 to 10 inclusive are duplicated on opposite sides of the machine shown in Figs. 1 and 2, and that these same parts are duplicated in each wing, with certain exceptions which will presently be seen. From the wheels 86, each cable 79 preferably extends over another pulley or grooved wheel 87, these latter wheels being journaled on the uprights 56, and the cables 79 extend from them into the interior of the casing and are operable by any appropriate means. For this purpose, I may employ one or more drums 88 on which these cables are simultaneously wound, and I may employ a worm gear 89 and a worm 90; or, in case I employ two cables 79 for each wing, as indicated in Fig. 2, it is obvious that I may employ two sets of worm gearings and drums such as indicated in Fig. 3, and have the worms 90 rotate in unison, so the cables 79 will all be operated in unison, so they will draw the front and rear ends of the planes evenly or at equal speed, thus preventing the casters from binding in the grooves or channels 68, 80, and 83.

The operation of collapsing the wings is as follows:

Referring again to Fig. 1, and assuming that the wings or planes have been dropped or folded to the broken line position, while the propeller 28 keeps the machine from falling, the pilot operates the worm gearing 89—90, thereby winding up the cables 79 and pulling the other sections 66 inward and upward until the casters 70—71 reach the broken line position in the carriage 60, whereupon, a preferably curved presser element 91 presses down a lever-arm 92. The other arm of this lever, which is indicated at 93, is pivoted to the upper end of the plunger 82, so that the latter is now withdrawn from the hole in the bottom of the channel 83, and the carriage 60 now begins to move inward, its casters traveling along the channel 83 until the caster $71^b$ reaches the end of this channel, whereupon, the carriage may be locked in this position to the section 64, and the outer section 66 may be locked to the carriage, if desirable, by any appropriate means (not shown); or the cable-drum or drums 88 may be locked by any appropriate means (not shown). However, it will be seen that the worm 90 will prevent the drums 88 from rotating, except when such worm is rotated by some force other than that exerted by the worm gear 89. For assisting the hinges 57 and uprights 61 in preventing the planes from rising beyond the flying position shown in Fig. 1, any desired number of cords or cables 94 may be attached to the inner and outer section of the planes, and drums 95 may be provided with springs or other appropriate means (not shown) for automatically taking up the slack of these cables 94 when the planes are folded and collapsed. For the sake of clearness, only one cable 94 is shown on each side of the machine, in Fig. 3.

After the wings have been collapsed, the pilot causes the propeller to gradually slow down until the machine alights in the position illustrated in Fig. 3, not being required to move along the surface as is an ordinary aeroplane. The collapsed planes now support the main body 20 so near the landing surface that there is but little (if any) danger of the machine toppling, and the nearness of the main body to the ground or landing surface has obvious importance. When starting to fly, the propeller is caused to rotate while in its vertical position shown in Fig. 2, the propeller 51 also being rotated sufficiently to keep the machine level. When the machine has risen a sufficient distance to permit the wings or planes to spread without interference with terrestrial objects, the worm 90 is operated for unwinding the drums 88, so that the outer sections 59 and carriages 60 descend to the broken line position of Fig. 1; and now, the pilot begins to shift the propeller from the vertical to the horizontal position, so the machine begins to move forward, and when it has attained a sufficient forward motion, the planes begin to spread because of their forwardly diverging relation to one another. In this connection, it should be understood that (in Fig. 1), the forward edges of the planes are indicated at $f$, and the rear edges are indicated at $r$. Therefore, the planes continue to rise until they reach the position shown in full lines of Figures 1 and 2, and now the latches 62 automatically engage the uprights 61 and hold the planes in the flying position.

Referring now to the modified form shown in Figs. 12 and 13, the propeller-shaft 27 rotates through a sleeve 100 which serves as a journal for two gear wheels 101 and 102, this sleeve and the gear wheels being held up by a collar 103 on the propeller shaft 27. In addition to the segmental gearing 31, previously described, with which the wheel 102 meshes, a segmental gearing 104 is provided on the opposite side of the machine and meshes with the wheel 101. The segmental gear 104 is essentially somewhat longer than the segmental gear 31, so the wheel 101 is essentially somewhat larger than the wheel 102, in order that the axis of these wheels (represented by the shaft 27) may travel from the vertical position to the broken line position while these wheels are in mesh with additional gearing such as shown in Figure 13. Of course, it is necessary for these wheels to rotate in opposite directions, and that they rotate in unison or at the same rate of travel along the gear segments 31 and 104. In Figure 13 the lines represent the pitch-lines of the circular gears and segmental racks, the same reference characters being applied thereto as to the respective gears and racks. Into the gear wheel 102 meshes a gear wheel 105, and into the gear wheel 101 meshes a combined spur and internal gear 106, the internal pitch-line being indicated at 107. The actuating shaft 37 carries two spur gears 108 and 109, the latter meshing with the spur gear 105, while the spur gear 108 meshes with the internal gear indicated at 107. It will be seen that when the shaft 37 and its gears 108 and 109 are rotated in a clockwise direction, it rotates the gear wheel 106—107 in the clockwise direction, thereby rotating the wheel 101 in the contra-clockwise direction, at the same time rotating the wheel 105 in the contra-clockwise direction and causing the wheel 102 to rotate in the clockwise direction. This movement obviously causes the wheels 101 and 102 to move in the same direction along the racks 31 and 104.

It is not intended to limit this invention to the exact details of construction here shown and described, but I claim the right of protection for such similar constructions and arrangements that fall within the scope of the inventive ideas as implied and claims.

What I claim as my invention is:

1. A flying machine including a main body or casing, planes hinged on opposite sides of the casing and being movable from a substantially horizontal position to a substantially vertical position, these wings being forwardly diverging when in the substantially vertical position, a propeller, means to shift the propeller from a vertical position to a horizontal position, and means to rotate the propeller in its different positions, and thereby cause the planes to rise from the vertical position to the horizontal position in the manner described.

2. In a flying machine, the combination of a main body, inner wing sections hinged thereon and movable from a substantially horizontal position to a substantially vertical position and vice versa, outer wing sections movably connected respectively to the inner wing sections so as to be movable bodily across the latter, and means to move the outer wing sections toward the hinges of said inner wing sections while the latter are at rest with respect to said main body.

3. The structure defined by claim 2, the last said means being effective to hold the wings in the collapsed position.

4. In a flying machine, a propeller-shaft including two sections, a propeller on one of said sections, means to rotate the other section, each of these sections including a gear wheel, a third gear wheel meshing with the gear wheels of these sections, a shaft on which said third gear wheel is mounted, bearings for the latter shaft and the propeller-shaft, these bearings and shafts being provided with connecting means which permits the propeller-carrying section to be moved at different angles with respect to the other said section while being rotated by the latter, a casing carrying said means to rotate the propeller-shaft, a segmental rack carried by the casing, a sleeve on the propeller-carrying section, a gear wheel journaled on said sleeve and meshing with said segmental rack, and means for rotating the last said gear wheel and thereby shifting the propeller-carrying section.

5. In a flying machine, the combination of a casing, a propeller, a shaft-section carrying the latter, a gearing mechanism operable to rotate the shaft-section while permitting it to be deflected laterally of its axis, a segmental gear carried by the casing, a segmental guiding element adjacent to the segmental gear, a sleeve through which the shaft-section rotates, said sleeve being provided with means to slidably engage with said guiding element and prevent rotation of the latter, a gear wheel mounted on said sleeve for rotation relative thereto and meshing with said segmental gear, a pinion meshing with said gear wheel, and manually operable means for rotating said pinion.

6. The combination of a propeller, a shaft section carrying the propeller and being movable laterally of its axis, means to rotate the shaft section while moving therewith, a sleeve through which the shaft section rotates, means to prevent rotation of said sleeve while permitting it to move laterally of its axis, a segmental gear, a gear wheel rotatable on said sleeve and meshing with said segmental gear, a bearing-member united with said sleeve, a pinion meshing with said gear wheel, and a shaft journaled in said bearing member and carrying said pinion and provided with means for rotating it, for the purpose specified.

In testimony whereof I affix my signature.

ALVAH HAWORTH.